United States Patent
Inata et al.

(10) Patent No.: US 7,978,763 B2
(45) Date of Patent: Jul. 12, 2011

(54) CODING SYSTEM, CODING METHOD AND CODING APPARATUS

(75) Inventors: Keisuke Inata, Ebina (JP); Daisuke Yoshida, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1595 days.

(21) Appl. No.: 11/238,928

(22) Filed: Sep. 28, 2005

(65) Prior Publication Data

US 2006/0083434 A1    Apr. 20, 2006

(30) Foreign Application Priority Data

Oct. 15, 2004    (JP) ................................ 2004-300888

(51) Int. Cl.
*H04N 7/12* (2006.01)
*G11B 5/86* (2006.01)

(52) U.S. Cl. ................ 375/240.01; 369/47.12

(58) Field of Classification Search .................... 348/97;
375/240.01; 369/47.12; 345/781
See application file for complete search history.

(56) References Cited

U.S. PATENT DOCUMENTS

| 6,034,720 A | * | 3/2000 | Poetsch et al. ............... 348/97 |
| 2003/0063125 A1 | * | 4/2003 | Miyajima et al. ............ 345/781 |
| 2004/0001402 A1 | * | 1/2004 | Hora ........................... 369/47.12 |

FOREIGN PATENT DOCUMENTS

JP    2002-358100    12/2002
JP    2003-087785    3/2003

* cited by examiner

*Primary Examiner* — Gims S Philippe
(74) *Attorney, Agent, or Firm* — Kilpatrick Townsend & Stockton LLP

(57) ABSTRACT

A video-coding apparatus acquires apparatus information from a connected external apparatus and automatically registers the external apparatus. Programs may be encoded in a file format appropriate for at least one external apparatus registered for the same program. A coded video file may be generated and stored. When the external apparatus is connected, a previously generated coded video file may be selected for playback by the external apparatus.

16 Claims, 4 Drawing Sheets

| Program No. | Registered Apparatus No. | Recording format | Recording level | Saving level |
|---|---|---|---|---|
| A | 2 | H.264 320×240 ... | 4 | 5 |
| | 3 | MPEG2 720×480 ... | 3 | 1 |
| | 4 | MPEG2 1920×1080 ... | 4 | 0 |

CODING SYSTEM, CODING METHOD AND CODING APPARATUS

BACKGROUND OF THE INVENTION

The present invention relates to a video-coding system, method, and apparatus for recording, selecting, and transmitting appropriate files for each of a plurality of external apparatuses connected to the video-coding apparatus.

In order to record information, two schemes are available to generate a master file and output the master file by using an external apparatus: (1) defining the external apparatus as the apparatus that is to process and acquire the master file, and (2) defining the local (transmitting) apparatus as the apparatus that is to process the master file, and the external apparatus as the apparatus to acquire the master file.

In scheme (1), the external apparatus acquires the foregoing master file intact. After acquiring the master file, the external apparatus conducts the resolution conversion process and/or format conversion process matching the screen of the monitor connected to the external apparatus. The external apparatus can thus reproduce the file and display it on the screen of the monitor. In this case, however, since the external apparatus conducts the resolution conversion process and/or the format conversion process, reproduction and display quality on the external apparatus side depends on the resolution conversion and/or format conversion capabilities of the external apparatus. In fields such as the mobile apparatus field, the various types of apparatus are present that conduct simplified resolution conversion and/or format conversion processes to save electric power and to reduce costs, in which case, there is a problem in that reproduction and display quality deteriorates. In addition, since the external apparatus acquires the master file and then conducts the resolution conversion and/or format conversion processes, a problem remains of whether the external apparatus can immediately respond from connection to reproduction and display. If real-time processing is conducted for faster reproduction or display, the deterioration of reproduction and display quality and increases in costs will result since real-time processing requires simplified resolution conversion and/or format conversion processes or enhancing the processing speed of the hardware to be used for the processes.

Scheme (2) is further divided into two types: (2-1) prior to transmission, generating an appropriate sub-file according to the particular specifications of the transmission destination external apparatus by transcoding the master file, and then sending the sub-file to the external apparatus; (2-2) generating a predetermined specific file simultaneously with the master file, then multiplexing the generated file, and transmitting the file of the necessary format according to the particular situation.

Technology (2-1) is described in, for example, Japanese Patent Laid-open No. 2003-87785 (p. 15, FIG. 1), and Technology (2-2) is described in, for example, Japanese Patent Laid-open No. 2002-358100 (p. 10, FIG. 7).

SUMMARY OF THE INVENTION

According to above technology (2-1), even if the external apparatus connected is not adapted to a resolution conversion function or the format of the master file, converting the master file into the appropriate format according to the specifications of the external apparatus prior to transmitting the necessary file from the local apparatus will make it possible to reproduce the file, and display it on the monitor, on the external apparatus side. However, since the conversion into the file format is started following the establishment of connection, the foregoing problem remains of immediate responsiveness from the connection to the reproduction and display. If real-time processing is conducted for faster reproduction or display, the deterioration of reproduction and display quality and increases in costs will result since real-time processing requires simplified resolution conversion and/or format conversion processes or enhancing the processing speed of the hardware to be used for the processes.

According to above technology (2-1), the problems discussed above about technology (2-1) can be solved if the external apparatus is adapted to the format of the file that has been generated beforehand. However, connection will be impossible if the external apparatus is not adapted to that file format.

In view of the above problem, it is an object of the present invention to provide a system, method, and apparatus that can conduct high-quality video file reproduction and display for connected external apparatus and realize immediate responsiveness from connection to reproduction and display.

Circuits of the video-coding apparatus according to the present invention include a coding block connectible to an external apparatus and intended to acquire and encode a master file, and an apparatus registration block to acquire apparatus information from the external apparatus and register the information; wherein the coding block generates a coded video file based on the information registered in the apparatus registration block.

According to the present invention, higher-quality coded video files can be supplied to a connected external apparatus more rapidly for improved operational convenience.

BRIEF DESCRIPTION OF THE DRAWINGS

These and other features, objects and advantages of the present invention will become more apparent from the following description when taken in conjunction with the accompanying drawings, wherein.

DETAILED DESCRIPTION OF PREFERRED EMBODIMENTS

Figure 1:
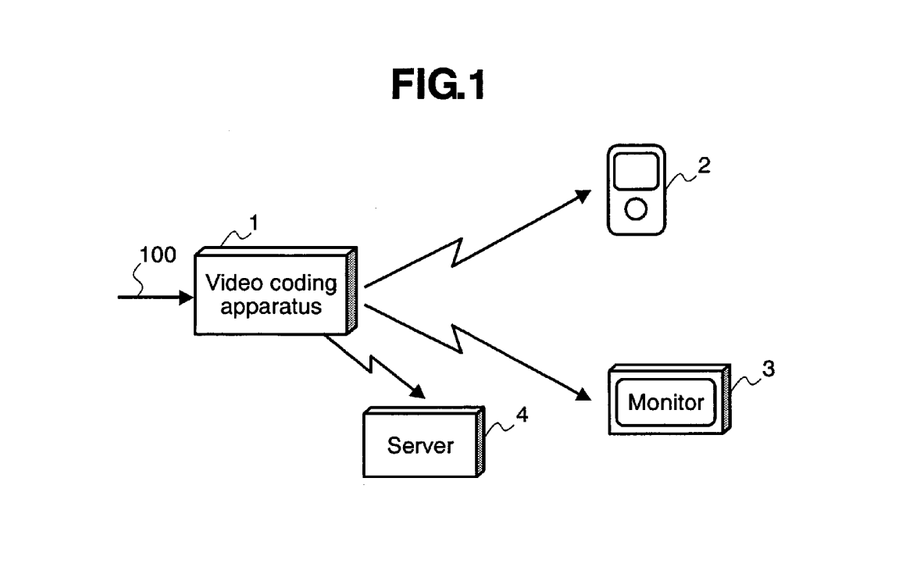
FIG. 1 illustrates a system embodying the present invention by way of typical example.

FIG. 1 illustrates a system embodying the present invention by way of typical example.

A first embodiment of the present invention is a system in which a video-coding apparatus 1 for acquiring video information 100 and encoding the information is connected to external apparatuses 2, 3, 4 in a wired or wireless fashion. Examples of the external apparatuses include a mobile video apparatus 2, a monitoring apparatus 3, and a file server or home server 4. Encoded video files that have been registered in the video-coding apparatus 1 can be acquired by connecting the external apparatuses 2, 3, 4 thereto.

The video-coding apparatus 1 generates and stores a coded video file in more than one kind of file format for the same video information. Usable file formats are based on, for example, screen resolution, coding, a frame rate, and a bit rate. The video-coding apparatus 1 outputs stored coded video files or reproduced video information to the external apparatuses.

An example in which the external apparatus 2 is connected to the video-coding apparatus 1 is described below. This example assumes that the external apparatus 2, after acquiring a coded video file, can reproduce the file and display it on an accompanying monitor. After the external apparatus 2 has accessed the video-coding apparatus 1 and selected a desired program, the video-coding apparatus 1 selects a coded video file associated with the selected program and appropriate for the external apparatus 2, and then outputs the file thereto. The external apparatus 2 reproduces the coded video file that it has acquired, and displays the video information on the accompanying monitor.

An example in which the external apparatus 3 is connected to the video-coding apparatus 1 is described below. This example assumes that even if the external apparatus 3 itself does not reproduce a coded video file, the external apparatus 3 can acquire a coded video file based on reproduced video information and display this file on an accompanying monitor. After the external apparatus 3 has accessed the video-coding apparatus 1 and selected a desired program, the video-coding apparatus 1 selects a coded video file associated with the selected program and appropriate for the external apparatus 3, and then outputs the video information thereto. The external apparatus 3 displays the thus-acquired video information on the accompanying monitor.

An example in which the external apparatus 4 is connected to the video-coding apparatus 1 is described below. This example assumes that the external apparatus 4 can store video files and that the apparatus 4 does not have a monitor. After the external apparatus 4 has accessed the video-coding apparatus 1 and selected a desired program, the video-coding apparatus 1 selects a coded video file associated with the selected program and appropriate for the external apparatus 4, and then outputs the video file thereto. The external apparatus 4 stores the thus-acquired video file into an internal storage block. For example, an optical disk medium, a hard disk medium, or a magnetic recording medium can be used to construct the storage block.

Figure 2:
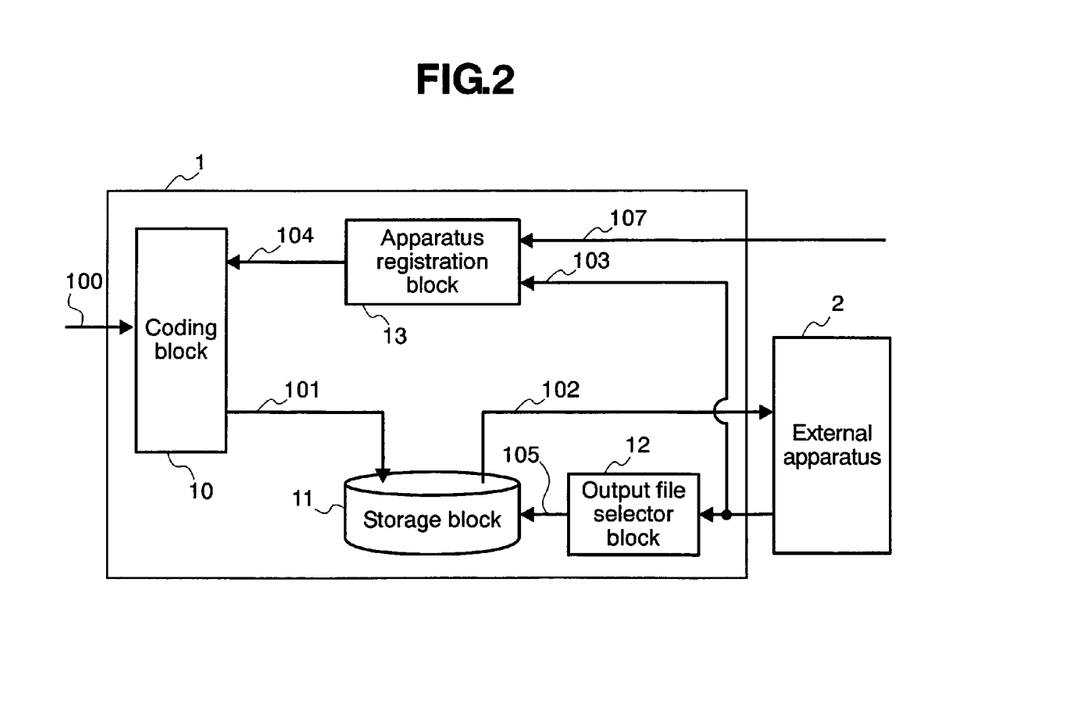
FIG. 2 is a detailed block diagram of the video-coding apparatus 1 shown in FIG. 1 by way of example.

FIG. 2 is a detailed block diagram of the video-coding apparatus 1 employed in a dynamic-image recording system according to the present embodiment by way of example.

Apparatus registration block 13 in FIG. 2 registers apparatus information 103 of the external apparatus 2 when it is connected to the video-coding apparatus 1. Examples of the apparatus information 103 include a file format that the connected apparatus can handle, communications path information, whether the connected apparatus has a reproduction capability, and whether a monitor accompanies the connected apparatus. Usable file formats are based on, for example, screen resolution, coding, a frame rate, and a bit rate.

An example of a way to transmit apparatus information 103 is described below. When connection to the external apparatus is established, a packet that includes apparatus information on the external apparatus is supplied to the video-coding apparatus 1. After receiving from the external apparatus the packet including the apparatus information, the video-coding apparatus 1 notifies to the external apparatus that acquisition of the packet has been completed. The video-coding apparatus 1 then judges that an exchange of the apparatus information between the external apparatus and the video-coding apparatus 1 has been completed, and enters after-connection operation. Next, another example of apparatus information transmission is described below. When connection of the external apparatus to the video-coding apparatus 1 is established, a request for apparatus information transmission is issued from the video-coding apparatus 1 to the external apparatus. After receiving this request, the external apparatus transmits a packet that includes apparatus information on the external apparatus, to the video-coding apparatus 1. On completion of acquiring the packet from the external apparatus, the video-coding apparatus 1 judges that an exchange of the apparatus information between the external apparatus and the video-coding apparatus 1 has been completed, and enters after-connection operation.

Apparatus information 107 may also be registered in the video-coding apparatus 1 directly from an external element such as a user interface. This will enable apparatus registration in the system to be executed even for the apparatus that originally cannot be registered. The apparatus-registration block 13 will supply registered apparatus information 104 to coding block 10.

The coding block 10 conducts a coding process for the video information 100 that has been input. Based on apparatus information 104 that has been acquired from the apparatus registration block 13, the coding process is conducted in appropriate file formats for each apparatus that was registered. Coded video files 101 that have thus been generated are supplied to storage block 11.

The storage block 11 stores the coded video files 101 supplied from the coding block 10. The storage block 11 also outputs a specified coded video file 101 to the external apparatus 2 in accordance with an instruction issued from an output file selector block 12.

On the basis of the apparatus information 103 supplied from the external apparatus 2, the output file selector block 12 selects a coded video file 102 of a file format appropriate for the connected apparatus 2, from the plurality of coded video files stored within the storage block 11. The output file selector block 12 also reads out the selected file from the storage block 11 and conducts control so that the file will be output to the external apparatus 2.

If apparatus not registered in the apparatus registration block 13 is connected, the output file selector block 12 selects and outputs a coded video file of the file format best suited to the external apparatus 2, among all stored file formats. A higher-quality coded video file can thus be reproduced.

Figure 3:
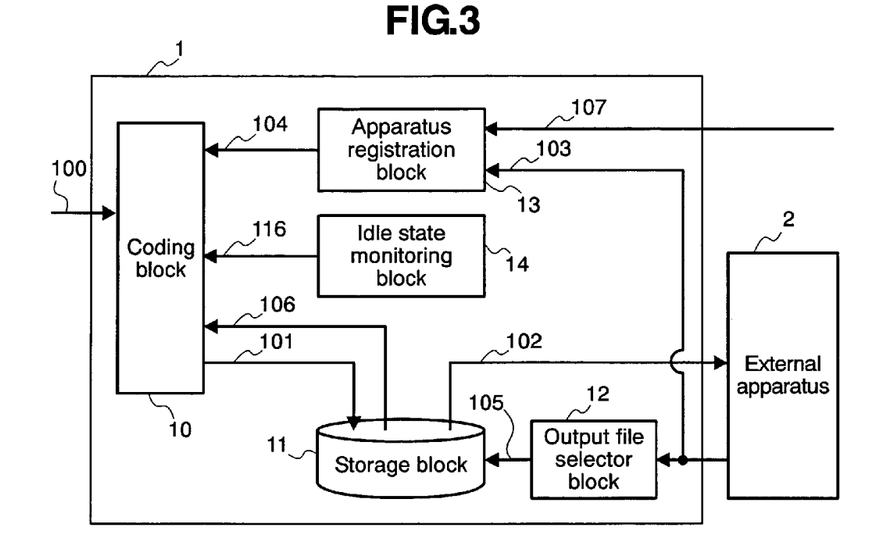
FIG. 3 is a detailed block diagram of the video-coding apparatus 1 shown in FIG. 1 by way of another example.

FIG. 3 is a detailed block diagram of the video-coding apparatus 1 employed in a dynamic-image recording system according to the present embodiment by way of another example.

In this system, a previously recorded master file is read out from a storage block 11 during an idle state in which a coding block 10 is not conducting a coding process or a transcoding process, and then the master file is transcoded by the coding block. This allows automatic generation of coded video files of appropriate file formats for each apparatus that has been registered. Apparatus registration block 13 has the same functions as those of the apparatus registration block 13 shown in FIG. 2.

An idle monitoring block 14 monitors a state in which the coding block 10 is not conducting a coding process or a transcoding process. The idle monitoring block 14 also gives the coding block 10 an instruction to conduct a coding process or a transcoding process when the coding block is in an idle state. The coding block 10 has the same functions as those of the coding block 10 shown in FIG. 2. In addition, after receiving the coding process or transcoding process instruction 116 from the idle monitoring block 14, the coding block 10 reads out previously recorded master file 106 from the storage block 11, then conducts a coding process or a transcoding process, and re-stores the master file into the storage block 11. The storage block 11 has the same functions as those of the storage block 11 shown in FIG. 2. The storage block also supplies stored files to the coding block 10. Output file selector block 12 has the same functions as those of the output file selector block 12 shown in FIG. 2.

In this manner, a coded video file is obtained as the master file by high-quality video coding during an idle period of time. A coding load can therefore be distributed by further generating a plurality of coded video files by sequential transcoding, based on that coded video file as the master file. The above can also be implemented with a processor of lower capabilities or at lower operating frequencies.

Alternatively, an original image that was used as a source of the coded video file obtained as the master file by high-quality video coding may be temporarily held in the storage block 11 during a period up to completion of the coded video file required. Sequentially coded video files will then be creatable during an idle period. In such a case, although a storage region is required for temporary storage of the original image, since each coded video file is coded using the original image, this method makes it possible to obtain higher-quality coded video files than those obtained by transcoding. After generation of the coded video file required, the original image may be deletable since it is much greater than coded video files in terms of capacity.

Figure 4:
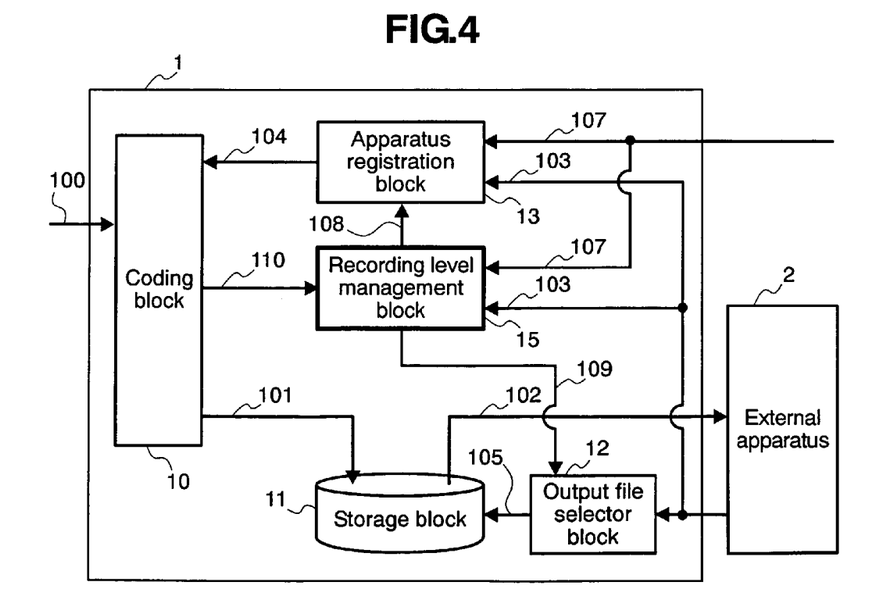
FIG. 4 is a detailed block diagram of the video-coding apparatus 1 shown in FIG. 1 by way of yet another example.

FIG. 4 is a detailed block diagram of the video-coding apparatus 1 employed in a dynamic-image recording system according to the present embodiment by way of further another example.

This system is characterized in that recording levels are defined for a plurality of external apparatuses 2 by using various information such as external apparatus connection information 103, user-specified information 107, and coded information 110 from a coding block 10, and coded video files of file formats appropriate for the external apparatus 2 are sequentially generated in descending order of the recording level. Additionally, the kinds of coded video files to be generated may be limited in descending order of the recording level.

Apparatus registration block 13 has the same functions as those of the apparatus registration block 13 shown in FIG. 2. The apparatus registration block 13 may also acquire recording level information 108 from a recording level management block 15 and incorporate the information into the apparatus information 104 supplied to a coding block 10. This allows batch management of information. In this case, the apparatus information 104 supplied to the coding block 10 on the basis of the recording levels may also be changed according to a particular available capacity of a storage block and/or the processing load applied to the coding block. Diversifying in this manner the parameter that is to be incorporated into a particular recording level makes it possible to achieve further detailed apparatus management according to particular conditions of the system and thus to reduce unnecessary recording. Information on the available capacity of the storage block and/or on the processing load of the coding block may be acquired from the storage block 11 and/or the coding block 10 or sequentially managed in the recording level management block. Also, apparatus level information 109 may be supplied to an output file selector block 12.

The recording level management block 15 manages the recording level information 108 of the external apparatus 2 and supplies the information to the apparatus registration block 13. The recording level information 108 identifies a priority level for the generation of a coded video file of a file format appropriate for each of the plurality of external apparatuses 2. Each time one of the external apparatuses 2 is connected to the video-coding apparatus 1, the recording level management block 15 acquires apparatus information of the particular connected apparatus, manages the frequency of connection of the external apparatus 2, and increments the recording level with each increase in the frequency of connection of the external apparatus. Also, user-specified recording level information 107 may be directly assigned to a desired external apparatus 2 from an external element. Thus, even the external apparatus that originally cannot be registered becomes registrable in the system. The above method also makes the system reconstructible to respond flexibly, even under operating conditions not matching judgment criteria under automation. In addition, the recording level information 108 of the external apparatus 2 associated with the coded video file generated may be determined from the coded information 110 of the coding block 10. Examples of the coded information include a frame rate, a bit rate, resolution, a processing load, and a processing time. Diversifying in this manner the parameter that is to be incorporated into a particular recording level makes it possible to achieve further detailed apparatus management according to the particular conditions of the system and thus to reduce unnecessary recording. The recording level management block 15 may also supply recording level information 109 to the output file selector block 12. Adding a recording level to a parameter of a saving level allows more flexible control of saving levels, thus reducing unnecessary storage into the storage block 11. The coding block 10 has the same functions as those of the coding block 10 shown in FIG. 2. The coding block 10 may also supply coded information 108 to the recording level management block 15. Examples of the coded information 110 include coded information of a file format, and coded processing load information. The storage block 11 has the same functions as those of the storage block 11 shown in FIG. 2. The output file selector block 12 has the same functions as those of the output file selector block 12 shown in FIG. 2. The output file selector block 12 may also have a function that acquires from the recording level management block 15.

Figure 5:
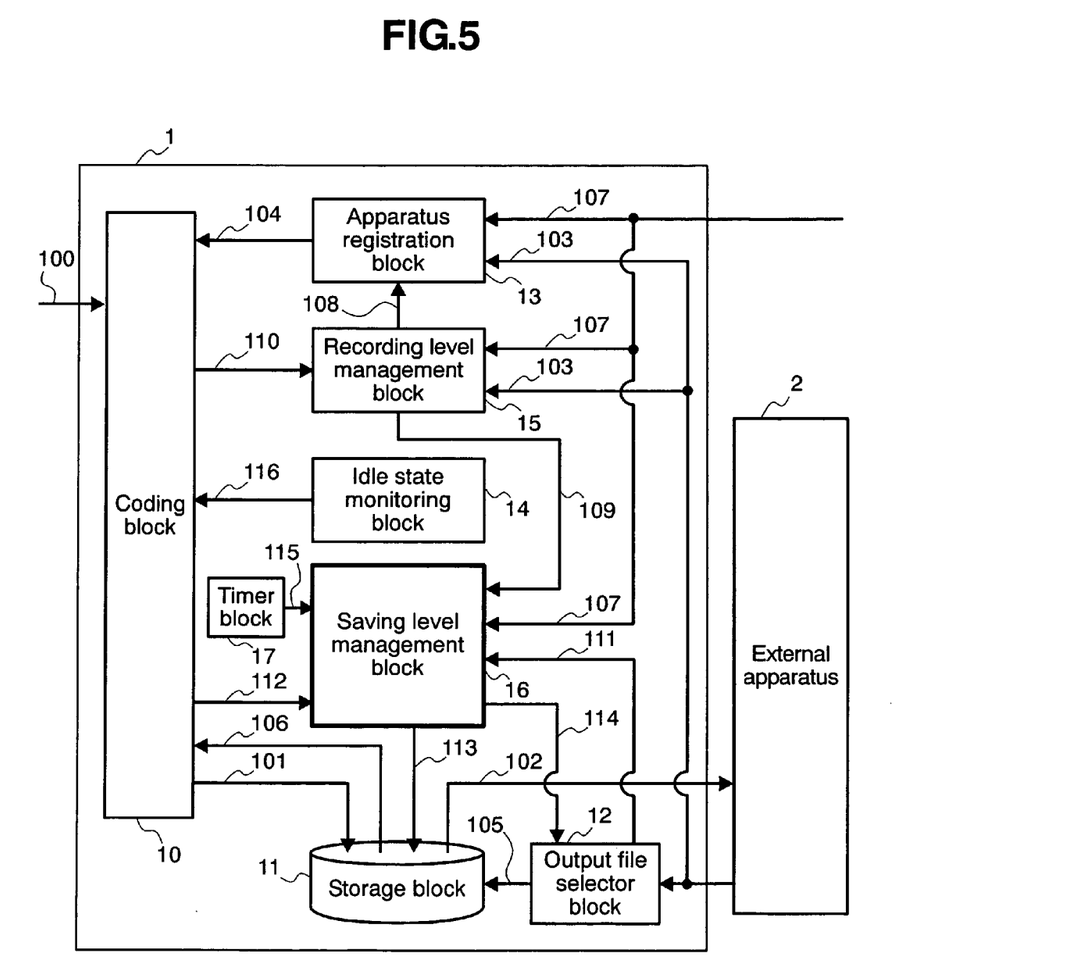
FIG. 5 is a detailed block diagram of the video-coding apparatus 1 shown in FIG. 1 by way of further another example.

FIG. 5 is a detailed block diagram of the video-coding apparatus 1 employed in a dynamic-image recording system according to the present embodiment by way of further example.

This system is characterized in that saving levels are defined for each of one or more coded video files stored within a storage block 11 and an appropriate one of these files is deleted according to a particular saving level. The saving level is a value that changes for each coded video file, during a period from completion of recording to a start of initial reproduction in an arbitrary or specific external apparatus, or during a period from the reproduction last conducted, or according to frequency of reproduction. For example, after recording, if no access is made for a required time, the saving level can be changed to a lower value, or if the coded video file is frequently accessed, the saving level can be changed to a higher value according to the frequency of access. It is also possible, for example, to raise the saving level if an access event is occurring frequently in a particular period, and after this, if the frequency of access decreases, to correspondingly lower the saving level.

Video file deletion from the storage block 11 may be executed for a coded video file whose saving level has been reduced below a desired value, or the deletion of a coded video file whose saving level has been reduced below the desired value may be executed only when the storage block 11 falls short of an available capacity. Otherwise, for example, after a list of files reduced in the saving level has been opened to an external user, this external user may be allowed to specify independent deletion of each coded video file or to specify the saving levels of the files which are to be deleted. Using such saving level information and/or other parameters in this way makes recorded video files deletable in an even minuter fashion according to situation, thus allowing unnecessary recording to be reduced. Apparatus registration block 13 has the same functions as those of the apparatus registration block 13 in the dynamic-image recording system shown in FIG. 2. Idle state monitoring block 14 has the same functions as those of the idle state monitoring block 14 in the dynamic-image recording system shown in FIG. 3. Recording level management block 15 has the same functions as those of the recording level management block 15 in the dynamic-image recording system shown in FIG. 4. The recording level management block 15 further supplies recording level information 109 to a saving level management block 16. Coding block 10 has the same functions as those of the coding block 10 shown in FIG. 3. The storage block 11 has the same functions as those of the storage block 11 shown in FIG. 2. The storage block 11 also supplies stored files to the coding block 10. In addition, the storage block 11 acquires a file deletion instruction 113 from the saving level management block 16 and deletes a specified file. Output file selector block 12 has the same functions as those of the output file selector block 12 shown in FIG. 2. The output file selector block 12 further acquires coded video file information 114 that has been deleted in accordance with an instruction from the saving level management block 16, and incorporates the information into output file selection.

On the basis of recording level information 109, saving level information specified directly from an external user, output file information and output timing, coded information and coding execution timing, and time-of-day information 115 from a timer 17, the saving level management block 16 determines the saving levels of the coded video files stored within the storage block 11, and manages the saving levels properly. On the basis of the recording level information 109, an initial value of the saving level of a coded video file may be determined as an example of using the recording level information 109. In a method, coded video files lower in recording level may have the initial values of respective saving levels reduced more significantly. An example of determining a saving level using the above-mentioned output file information and output timing 112, coded information and coding execution timing 111, and/or the time-of-day information 115 from the timer 117, is shown below. That is to say, a value of the time-of-day information 115 at receipt of the output timing 112, and a value of the time-of-day information 115 at receipt of the coding execution timing 111 are managed, a difference between the two values is defined as the frequency of access, and the saving level of the file is lowered when the frequency of access decreases below a required value.

Figure 6:
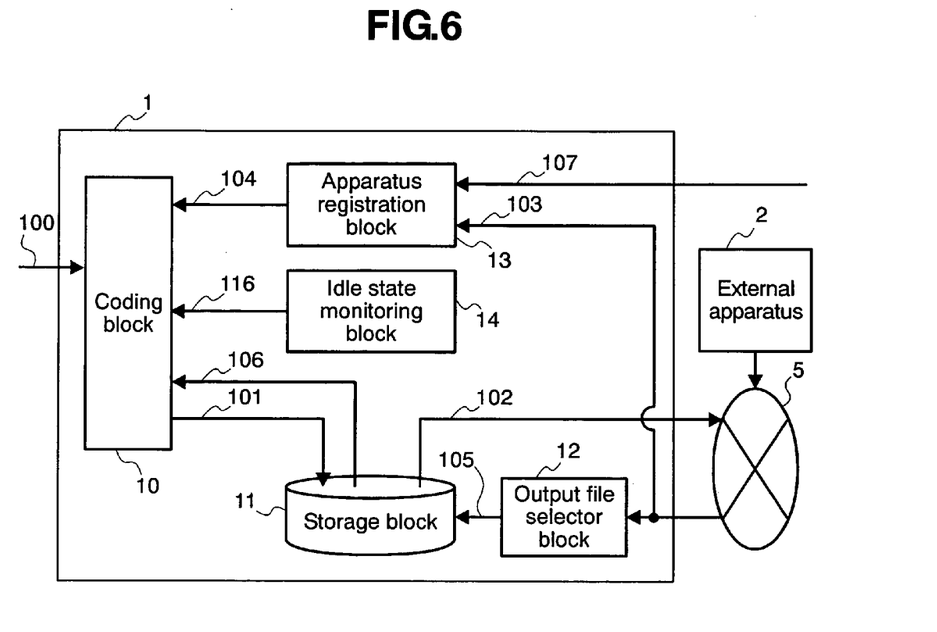
FIG. 6 is a detailed block diagram of the video-coding apparatus 1 shown in FIG. 1 by way of further another example.

FIG. 6 shows an example of connecting external apparatus 2 to video-coding apparatus 1 via an external network in FIG. 3.

Next, a further example of a dynamic-image recording system according to the present invention will be described using FIGS. 1 and 3.

A case in which two external apparatuses 2, 3 are simultaneously connected to video-coding apparatus 1 is considered. When the two external apparatus 2, 3 each request a different program or the same program, simultaneous watching thereof becomes possible by supplying from the output file selector block 12 a coded video file 102 of a file format appropriate for the external apparatuses 2, 3. Also, since the video file 102 has already been coded, the time required from acceptance of a supply request from the external apparatuses 2, 3, to supply of the file thereto, is shortened to realize immediate responsiveness. In addition, during program recording, in other words, during processing by the coding block 10, it becomes possible for the coding block to continue the coding process and supply the coded video file 102 to the external apparatuses 2, 3 when connection thereof is established. Furthermore, since coded video files 102 are generated before being supplied to the external apparatuses 2, 3, the above method makes it possible to generate coded video files of video quality higher than that obtained by real-time file-format conversion such as a multipath encoding process or a filtering process or search range extending process large in processing load. Besides, even if the external apparatuses 2, 3 are poor in format conversion capability, since the file supplied thereto will have been converted into an appropriate format beforehand, the external apparatus 2, 3 will be able to achieve higher-quality video file reproduction or display without conducting a format conversion. Moreover, the dynamic-image recording system shown in FIGS. 2, 3, 4, 5 and 6 can contain audio information in addition to video information. Furthermore, processing in the coding block 10 may also include audio information coding or transcoding. This system can be applied to not only video data, but also audio data and still image data.

Figure 7:
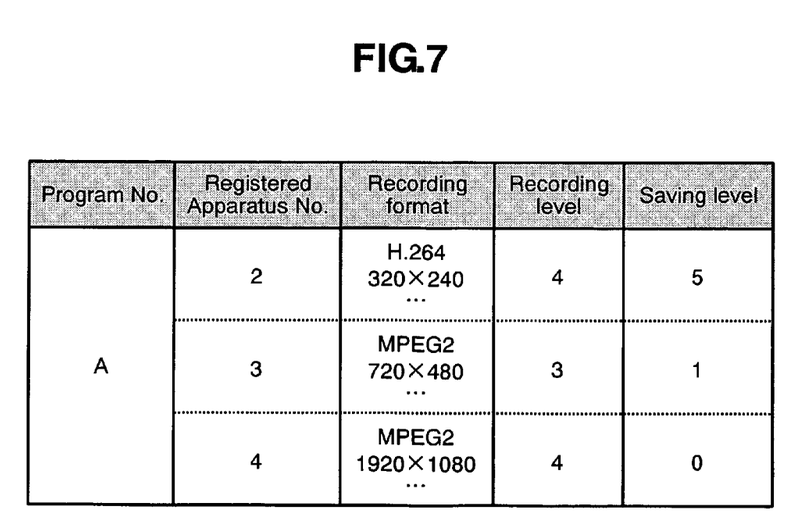
FIG. 7 is a table that lists recording levels, saving levels, and file formats of recording of program No. A by way of example.

FIG. 7 is a table, as an example, that lists recording levels, saving levels, and file formats of recording of program No. A under the environment where the external apparatuses 2, 3, 4 shown in FIG. 1 are connected to the video-coding apparatus 1 shown in FIG. 5. Each file format is appropriate for the particular external apparatus, and parameters include the kind of coding scheme, resolution, and a frame rate. In FIG. 7, six levels from 0 to 5 are shown as recording levels and saving levels. A server is taken as an example of the external apparatus 4, and this example assumes a situation in which a recorded, coded video file is not accessed for a long time after being acquired into the server. In this example, although high recording levels are shown with awareness of saving in the server, since the file has already been saved and the file is not accessed at all after that, the saving levels exhibit a tendency of lowering progressively, finally to 0.

While we have shown and described several embodiments in accordance with our invention, it should be understood that disclosed embodiments are susceptible of changes and modifications without departing from the scope of the invention. Therefore, we do not intend to be bound by the details shown and described herein, but intend to cover all such changes and modifications as fall within the ambit of the appended claims.

What is claimed is:

1. A video-coding apparatus connectible to an external apparatus, comprising:
   a coding block to receive and code a master file that is input;
   an apparatus registration block to acquire and register the apparatus information sent from the external apparatus; and
   a monitoring block to monitor operation of said coding block;

wherein said coding block generates a coded video file based on the information registered in said apparatus registration block and based on a monitoring status of said monitoring block.

2. The video-coding apparatus according to claim 1, wherein the apparatus information is:
information relating to screen resolution and/or an encoding scheme and/or a frame rate and/or a bit rate of the external apparatus; and/or
communications path information relating to the external apparatus, and/or information on whether the external apparatus has a reproduction capability and/or a monitor.

3. The video-coding apparatus according to claim 1, wherein when receiving the master file, said coding block generates a coded video file.

4. A video-coding apparatus connectible to an external apparatus, comprising:
a coding block to receive and code a master file that is input;
an apparatus registration block to acquire and register the apparatus information sent from the external apparatus;
a storage block to store the coded video file generated on the basis of the registered information;
an output file selector block to select, from the coded video files stored into said storage block, a coded video file appropriate for and to be output to the external apparatus; and
a recording level management block to manage priority levels of generation of coded video files by said coding block;
wherein said video-coding apparatus outputs to the external apparatus the coded video file that said output file selector block selects,
wherein said coding block generates a coded video file based on the information registered in said apparatus registration block and on the basis of a level managed by said management block.

5. The video-coding apparatus according to claim 4, wherein the apparatus information is:
information relating to screen resolution and/or an encoding scheme and/or a frame rate and/or a bit rate of the external apparatus; and/or
communications path information relating to the external apparatus, and/or information on whether the external apparatus has a reproduction capability and/or a monitor.

6. The video-coding apparatus according to claim 4, wherein when receiving the master file, said coding block generates a coded video file.

7. A video-coding apparatus connectible to an external apparatus, comprising:
a coding block to receive and code a master file that is input;
an apparatus registration block to acquire and register the apparatus information sent from the external apparatus;
a storage block to store the coded video file generated on the basis of the registered information;
an output file selector block to select, from the coded video files stored into said storage block, a coded video file appropriate for and to be output to the external apparatus; and
a saving level management block to manage a saving status of the coded video files stored into said storage block;
wherein said video-coding apparatus outputs to the external apparatus the coded video file that said output file selector block selects,
wherein said coding block generates a coded video file based on the information registered in said apparatus registration block,
wherein the coded video files stored into said storage block are deleted on the basis of a level managed by said management block.

8. The video-coding apparatus according to claim 7, wherein the apparatus information is:
information relating to screen resolution and/or an encoding scheme and/or a frame rate and/or a bit rate of the external apparatus; and/or
communications path information relating to the external apparatus, and/or information on whether the external apparatus has a reproduction capability and/or a monitor.

9. The video-coding apparatus according to claim 7, wherein when receiving the master file, said coding block generates a coded video file.

10. A method of coding video information, comprising:
establishing connection to an external apparatus;
acquiring and registering apparatus information sent from the external apparatus;
receiving a video file that is input as a master file;
coding the master file on the basis of the apparatus information registered;
generating a coded video file;
monitoring an operational state of the coding of the master file; and
generating a coded video file based on a monitoring status of the coding operation.

11. A method of coding video information, comprising:
establishing connection to an external apparatus;
acquiring and registering apparatus information sent from the external apparatus;
receiving a video file that is input as a master file;
coding the master file on the basis of the apparatus information registered;
generating a coded video file;
storing the coded video file generated on the basis of the information registered;
selecting, from the coded video files stored, a coded video file appropriate for the external apparatus;
transmitting to the external apparatus the coded video file selected;
managing priority levels of generation of the coded video files; and
generating each coded video file by the coding operation based on the priority level of generation.

12. A method of coding video information, comprising:
establishing connection to an external apparatus;
acquiring and registering apparatus information sent from the external apparatus;
receiving a video file that is input as a master file;
coding the master file on the basis of the apparatus information registered;
generating a coded video file;
storing the coded video file generated on the basis of the information registered;
selecting, from the coded video files stored, a coded video file appropriate for the external apparatus;
transmitting to the external apparatus the coded video file selected;
managing a saving status of the coded video files stored; and
deleting the stored coded video files on the basis of the saving status.

13. A video-coding apparatus comprising:
a coding block to receive and code a master file that is input;
an apparatus registration block to acquire and register the apparatus information sent from the external apparatus;
a storage block to store the coded video file generated on the basis of the registered information;
an output file selector block to select, from the coded video files stored into said storage block, a coded video file appropriate for and to be output to the external apparatus;
a recording level management block to manage priority levels of generation of coded video files by said coding block; and
a saving level management block to manage a saving status of the coded video files stored into said storage block,
wherein said video-coding apparatus outputs to the external apparatus the coded video file that said output file selector block selects,
wherein said coding block generates a coded video file based on the information registered in said apparatus registration block,
wherein said coding block further generates coded video files on the basis of a level managed by said management block,
wherein the coded video files stored into said storage block are deleted on the basis of a level managed by said management block.

14. The video-coding apparatus according to claim 13, wherein on the basis of the recording level information, an initial value of the saving level of a coded video file may be determined.

15. A method in a video-coding apparatus comprising the video-coding apparatus performing steps of:
receiving and coding a master file that is input to the video-coding apparatus to generate a coded video file;
acquiring and registering apparatus information sent from an external apparatus;
storing the generated coded video file on the basis of the registered information;
selecting, from the coded video files stored into said storage block, a coded video file appropriate for and to be output to the external apparatus;
managing priority levels of generated coded video files; and
managing a saving status of the coded video files stored into said storage block,
wherein the selected coded video file is output to the external apparatus,
wherein the generated coded video file is generated based on the apparatus information acquired from the external apparatus,
wherein the generated coded video file is further generated based on a priority level thereof,
wherein the coded video files stored into said storage block are deleted based on priority levels thereof.

16. The method according to claim 15, wherein on the basis of the recording level information, an initial value of the saving level of a coded video file may be determined.

* * * * *